J. W. SMITH.
PROTECTOR FOR PNEUMATIC TIRES.
APPLICATION FILED DEC. 18, 1915.
1,242,484.
Patented Oct. 9, 1917.
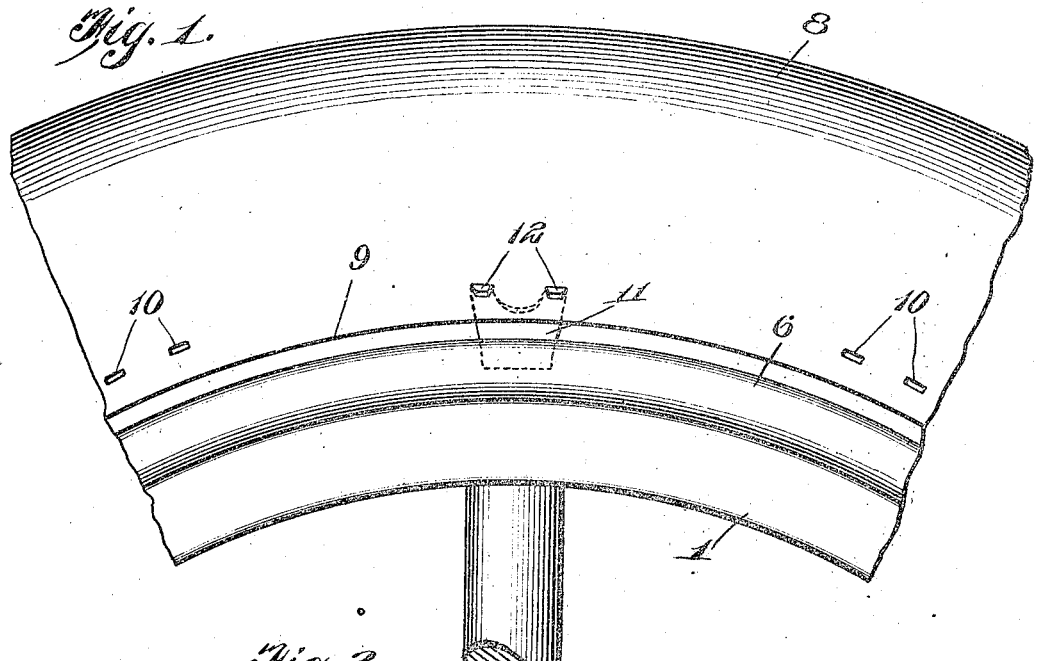
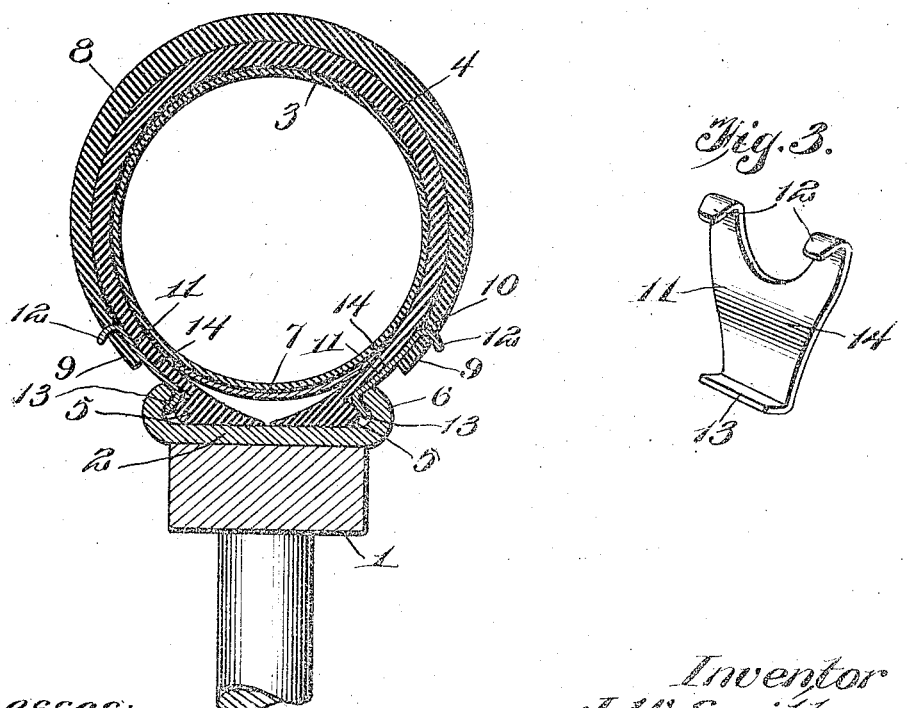
Witnesses:
Louis R. Heinrichs
Inventor
J. W. Smith

UNITED STATES PATENT OFFICE.

JUNIUS W. SMITH, OF NOOKSACK, WASHINGTON.

PROTECTOR FOR PNEUMATIC TIRES.

1,242,484. Specification of Letters Patent. Patented Oct. 9, 1917.

Application filed December 18, 1915. Serial No. 67,656.

*To all whom it may concern:*

Be it known that I, JUNIUS W. SMITH, a citizen of the United States of America, residing at Nooksack, in the county of Whatcom and State of Washington, have invented certain new and useful Improvements in Protectors for Pneumatic Tires, of which the following is a specification, reference being had therein to the accompanying drawing.

This invention relates to a cover or protector for guarding pneumatic tires against objects liable to puncture or otherwise injure them when in use, and particularly to a novel construction of means for connecting a cover or protector of the indicated character with the rim of a vehicle wheel, whereby the cover or protector may be held securely in applied position.

The primary object of the invention is to provide means whereby a cover or protector may be formed from an old tire or outer casing of the clencher type by simply cutting away the clencher portion of the tire and disposing the same about the tire in use on the wheel and then connecting the free edges of the outer covering or tire with the clencher flanges of the wheel rim.

A further object of the invention is to provide a novel construction of connector or fastener for the described purpose, which will permit of the effective use of a protector formed from an old tire and may be employed to couple the same to the rim in such a manner as to hold the protector in close contact with the tire and prevent the same from coming loose or shifting circumferentially of the wheel.

The invention consists in the features of construction, combination and arrangement of parts hereinafter more fully described and claimed, reference being had to the accompanying drawings, wherein—

Figure 1 is a side elevation of a portion of a wheel rim and tire showing the application of my invention;

Fig. 2 is a vertical transverse section of the same; and

Fig. 3 is a perspective view of one of the fasteners or connectors.

Referring to the drawing, 1 designates an automobile or other similar wheel provided with a clencher rim 2 and a tire of the type comprising an inner air containing tube 3 and an outer clencher tire, casing or shoe, 4, having its free edges on the rim side provided with clencher ribs 5 for interlocking engagement with clencher flanges 6 at the sides of the rim 2. The numeral 7 designates the usual liner which is applied between the tube 3 and rim side of the outer casing to protect the tube in a manner well understood.

In many cases it is desirable to provide some means for covering and protecting a tire from puncture or other injury, and particularly when the tire has been subjected to considerable wear or is weakened from other causes. Such protecting means is especially desirable where a tire in use, which may be otherwise good, has a portion which is liable to blow out under the internal pressure. Covers or guards of various kinds have been suggested, but most of these give inadequate protection, particularly at the sides of the tire, and I have found it very economical and advantageous to employ as a protector an old tire or outer casing which may be useless for direct service but will effectually perform the function of a protector.

In the use of such an old tire it is necessary to provide some means for fastening the same in position in such a manner as to prevent the protector tire from displacing the clencher members of the tire, or shifting circumferentially of the wheel, with the consequent liability of displacing the tire when the vehicle is running. I have found that by the use of an improved type of connector, constructed and designed for the especial purpose, I may employ an old tire as a tire protector with great advantage and may be able to secure the same to the wheel in such a manner as to prevent displacement or shifting of any of the connected parts.

In carrying my invention into practice, I provide a cover or protector 8 which is preferably made, as stated, of an old tire, and which is adapted for the purpose by simply cutting away the clencher portions thereof, leaving the free flexible longitudinal edges 9, which are further adapted for the purpose by providing the same with spaced pairs of slots or openings 10 at desired intervals around and concentric with said edges 9.

The cover 8 is then placed in position about the tire 4 so as to completely envelop the same except at points immediately adjacent to the clencher flanges 6 of the rim, both the tread and sides of the tire being, however, covered and guarded, so as to not only protect the tread but also the sides against punctures or other injuries. The edges 9 of the protector are then fastened to the rim by means of connectors 11 each comprising a substantially triangular metal plate, which is of slightly bowed form in the longitudinal direction to fit against the rim portions of the tire and is forked or branched at its wide end and provided with engaging hooks 12, the opposite or narrow end of the connector being provided with a retaining flange 13 extending at an angle therefrom. The hooked ends 12 of the respective fasteners are then passed from the inner side of the protector through the slots 10 and the connectors arranged to lie in contact with the sides of the tire 4 and their flanges disposed between the clencher ribs 5 of the tire and the clencher flanges 6 of the rim, the bowed or curved surfaces 14 of the connectors lying in contact with and conforming to the surfaces of the sides of the tire adjacent to the rim flanges, as clearly shown in Fig. 2.

When the fasteners or connectors are thus applied, the cover will be secured at each side at regular intervals to the rim entirely around the wheel and the connectors will hold the cover in place while permitting it to freely bend or flex with the tire to preserve the resiliency thereof. In such operation the flange 13 will pivot to a degree upon and between the clencher surfaces of the rim and tire to allow free and ample elasticity but will be held by the pressure of the tire against and in interlocking engagement with the flanges 6, so that the connectors cannot possibly pull out or become otherwise displaced and displace the tire or allow the protector to creep longitudinally of the wheel. The connectors, however, afford a firm connection of the protector with the wheel rim, while permitting of the ready application and removal of the connector when occasion requires. It will thus be seen that a protector may be inexpensively produced in the manner described by the use of the improved fasteners, with great economy and advantage over protectors of the kind heretofore suggested.

I claim as my invention:

In a protector for pneumatic tires, the combination with a wheel rim having clencher flanges, and a tire having clencher ribs for engagement with said flanges, of a protector enveloping the tread and sides of the tire and having longitudinally alined slots therein arranged in pairs at intervals around the free edges thereof, and connectors between said protector and said clencher flanges, said connectors comprising bowed triangular plates arranged to bear against the sides of the tire and having their widened ends provided with centrally positioned substantially semi-circular cut away portions defining a pair of legs, each leg end being bent at an acute angle to the body portion of the connector to provide a pair of hooks for reception in a coöperating pair of slots in the protector, and the narrow ends of the connectors being provided with retaining flanges bent at an angle thereto and extending from side to side and clamped between the clencher surfaces of the tire and rim.

In testimony whereof I hereunto affix my signature in the presence of two witnesses.

JUNIUS W. SMITH.

Witnesses:
GOMER THOMAS,
VIRGIL PERINGER.

Copies of this patent may be obtained for five cents each, by addressing the "Commissioner of Patents, Washington, D. C."